United States Patent [19]

Kuster et al.

[11] Patent Number: 4,983,205
[45] Date of Patent: Jan. 8, 1991

[54] APPARATUS FOR BENDING GLASS PLATES

[75] Inventors: Hans-Werner Kuster, Aachen, Fed. Rep. of Germany; Luc Vanaschen, Eupen, Belgium; Hans-Josef Promper, Aachen, Fed. Rep. of Germany

[73] Assignee: Saint-Gobain Vitrage International, Courbevoie, France

[21] Appl. No.: 493,792

[22] Filed: Mar. 15, 1990

[30] Foreign Application Priority Data

Mar. 16, 1989 [DE] Fed. Rep. of Germany ....... 3908644

[51] Int. Cl.$^5$ .......................................... C03B 23/033
[52] U.S. Cl. ........................................ 65/290; 65/104; 65/348; 65/374.12
[58] Field of Search ................ 65/104, 286, 287, 288, 65/289, 290, 348, 374.12

[56] References Cited

U.S. PATENT DOCUMENTS

| | | | |
|---|---|---|---|
| 3,077,753 | 2/1963 | Dammers | 65/287 X |
| 3,389,984 | 6/1968 | Englehart et al. | 65/287 |
| 3,420,652 | 1/1969 | Seymour | 65/287 |
| 3,806,330 | 4/1974 | Martin | 65/287 X |
| 4,666,496 | 5/1987 | Fecik et al. | 65/204 X |
| 4,906,271 | 3/1990 | D'Iribarne et al. | 65/374.12 X |

Primary Examiner—Robert L. Lindsay
Attorney, Agent, or Firm—Oblon, Spivak, McClelland, Maier & Neustadt

[57] ABSTRACT

An apparatus for bending and tempering glass plates has a horizontal roller furnace (3) and a press bending station with two water-cooled bending molds (6,7) through whose contact the glass plates are tempered immediately following bending. At the outlet from the roller furnace (3), the glass plates (1) are taken over by a continuous flexible conveyor belt (10) and are conveyed by the latter into the bending station. During the press process the glass plate remains on the conveyor belt, which is interposed between the glass plate (1) and the lower bending mold (7). The conveyor belt (10) is made from a woven or knitted fabric of heat-resistant metal fibers and, in a direction at right angles to its surface, has a heat resistivity of $0.25 \times 10^{-3}$ to $5 \times 10^{-3}$ $m^2 \times K \times W^{-1}$.

11 Claims, 1 Drawing Sheet

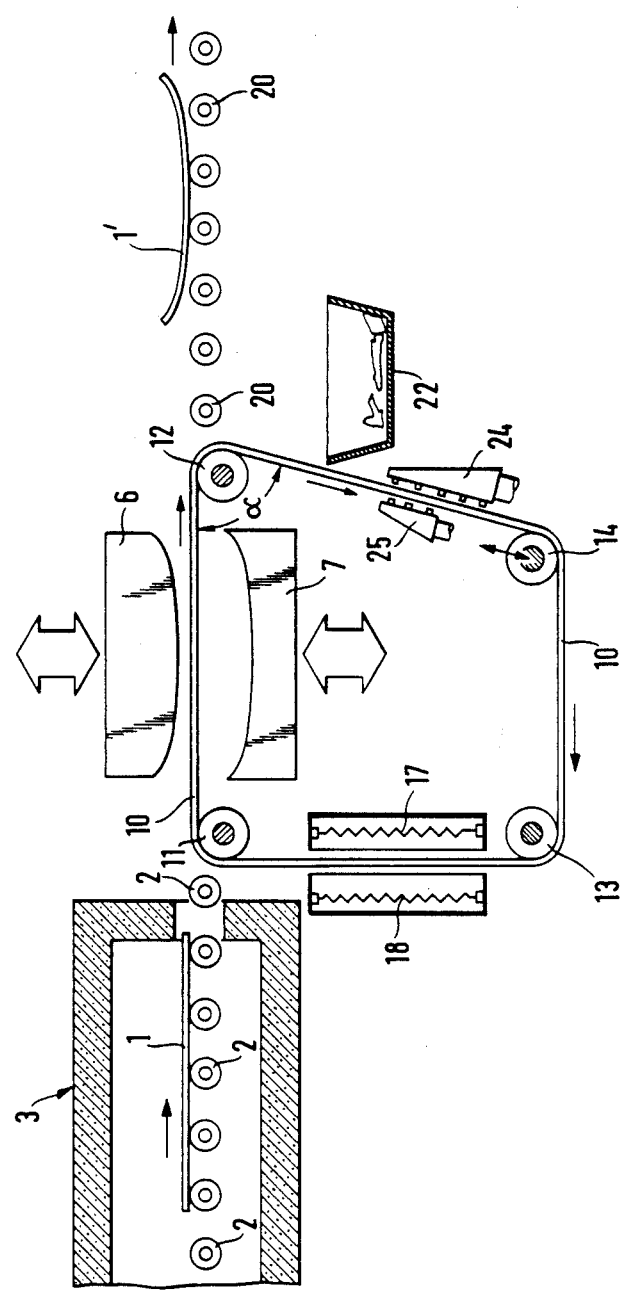

APPARATUS FOR BENDING GLASS PLATES

BACKGROUND OF THE INVENTION

1. Field of the Invention

The invention relates to an apparatus for bending and tempering glass plates, with a horizontal roller furnace for heating glass plates to the bending temperature, a press bending station following the roller furnace and a cooling station following the press bending station, a flexible conveyor belt being provided between the roller furnace and the cooling station which takes over the glass plate from the furnace roller bed and conveys it into the bending station, in which the glass plate is bent together with the conveyor belt and the bent glass plate is subsequently conveyed into the cooling station.

2. Background of the Related Art

An apparatus of this type is described in DE-AS 14 71 872. The bending press there comprises a convex, upper bending mold and a concave, lower bending mold of conventional construction. Following the bending process, cooling air is supplied to both surfaces of the glass plate in the bending station in order to give it the necessary dimensional stability. This cooling is followed by the actual tempering process in a following cooling station constructed as a tempering station.

This known apparatus only makes it possible to temper glass plates having a thickness of at least 5 mm. If the glass plates are thinner than 5 mm, after cooling for dimensional stability purposes, their interior has already been cooled to such an extent that their temperature is no longer adequate for obtaining the necessary tempering.

DE-AS 12 92 806 discloses a process for bending and tempering glass plates, in which the glass plate in the horizontal position is placed on a soft, resilient mat of nonflammable fabric fixed to the molds of a bending press and during press bending is kept supported on the mat. For the purpose of the subsequent tempering, the molds can be cooled by a fluid medium flowing through them. The mat fixed between the molds can be made from a glass fiber fabric reinforced with metal threads.

In this known process additional means are required in order to transfer the glass plates heated to the bending temperature from the furnace conveying rolls onto the fixed mat. These additional means must be removed from the bending press area following the positioning of the glass plates on the mat. Such a process requires a certain additional time, which leads to a glass plate temperature loss. However, as the glass plate must have a certain minimum temperature for tempering purposes, the plate must be heated to a correspondingly higher temperature in order to compensate for this temperature loss. However, in the case of glass plates thinner than 5 mm, such a more pronounced heating in the preceding roller furnace necessarily leads to problems in connection with the optical properties of the glass plates, due to the increased deformation risk of thin glass plates. In addition, even if a glass fiber fabric is reinforced with metal threads, it has a relatively high heat resistivity, which is prejudicial to a rapid cooling of the lower glass plate surface. Thus, this process is once again only suitable for bending and tempering glass plates with a thickness greater than about 5 mm.

SUMMARY OF THE INVENTION

An object of the invention is to construct an apparatus of the aforementioned type that permits the bending and tempering of glass plates with a thickness less than 5 mm.

According to the invention, bending tools in the press bending station comprise water-cooled, full-surface platens, through whose whole-surface contact the glass plates are given the desired tempering immediately following bending, and the conveyor belt comprises a knitted or woven fabric of heat-resistant metal fibres, which in a direction at right angles to the plane of the conveyor belt has a heat resistivity of $0.24 \times 10^{-3}$ to $5 \times 10^{-3} m^2 \times K \times W^{-1}$.

Through the use of water-cooled molds with uninterrupted contact surfaces, ensuring as a result of the whole-surface contact with the glass surface a good heat transfer from said glass surface to the mold, as well as through the use of a conveyor belt with the indicated low heat resistivity values or correspondingly high heat conduction values, the desired object can be achieved. The cooling action of the press tools in the bending station is so high under these conditions that it is also possible to bend and temper with the aid of the apparatus glass plates with a thickness of less than 5 mm. Due to the simple, effective conveying system, it is possible to achieve short cycle times so that the system operates very efficiently.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The sole FIGURE is a schematic view of a glass plate bending system incorporating the invention.

DETAILED DESCRIPTION OF THE PREFERRED EMBODIMENT

Referring now to the drawing, the glass plates 1 to be bent and tempered are conveyed in a horizontal position on driven conveying rolls 2 through a continuous furnace 3, in which they are heated to their bending temperature of approximately 650° C.

From furnace 3 the glass plates 1 heated to their bending temperature pass into the bending station, where there is a bending press having a convex, upper bending mold 6 and a concave, lower bending mold 7. The two bending molds 6, 7 are moved vertically by the bending press in a known manner. In each case the bending molds 6, 7 have a closed bending surface, the bending mold walls forming the bending surfaces being in each case made from a material with a high thermal conductivity. Cooling water flows through cooling means in both the bending molds 6, 7. The cooling means and the construction and materials of the bending molds 6, 7 are such that the necessary heat dissipation results, this being necessary for a completely satisfactory tempering of the glass plates if the latter are to have the characteristics of a safety glass.

The heated glass plates are received from the conveying rolls 2 by the conveyor belt 10, which is driven at the same speed as rolls 2. It comprises a continuous fabric belt, which is guided over the two upper guide rollers 11, 12, and over the two lower reversing rollers 13, 14. The lower reversing roller 14 is resiliently mounted in order to compensate for the bending of the conveyor belt 10 occurring during the glass plate pressing process. During the press bending process the glass plate remains on the conveyor belt 10, which in this way serves as an intermediate layer between the bending surface of the lower bending mold 7 and the glass plate.

For the reasons indicated hereinbefore, the conveyor belt 10 has a low heat resistivity in a direction at right angles to its surface. If the glass plates to be bent and tempered have a thickness of 6 mm, the thickness and construction of the fabric forming the conveyor belt, as well as the metal used for producing the fabric, must be chosen in such a way that the reat resistivity in a direction at right angles to the surface of the fabric is $2.5 \times 10^{-3}$ to $5 \times 10^{-3} m^2 \times K \times W^{-1}$. For bending and tempering 4 mm thick glass plates, the aforementioned parameters must be chosen in such a way that the heat resistivity through the conveyor belt fabric in a direction at right angles to its surface is equal to or smaller than $2.5 \times 10^{-3} m^2 \times K \times W^{-1}$. Preferably the heat resistivity in the case of a glass plate thickness of 4 mm is between $1.5 \times 10^{-3}$ and $2.5 \times 10^{-3} m^2 \times K \times W^{-1}$. If the thickness of the glass plates to be bent and tempered is 3 mm, then the heat resistivity of the conveyor belt must be lower than $1.6 \times 10^{-3} m^{-2} \times K \times W^{-1}$ and is preferably in the range $1 \times 10^{-3}$ to $1.5 \times 10^{-3} m^2 \times K \times W^{-1}$. If the glass plates with a thickness of only 2 mm are to be tempered, then the heat resistivity must be below $1 \times 10^{-3} m^2 \times K \times W^{-1}$ and is preferably between $0.7 \times 10^{-3}$ and $0.9 \times 10^{-3} m^2 \times K \times W^{-1}$.

The knitted or woven fabric forming the conveyor belt 10 is preferably formed with an iron-chrome-nickel alloy, such as is used for heat resistant steels, or is constituted by an alloy comprising mainly chrome and nickel with, e.g., 15% chrome and 75% nickel. For producing the woven or knitted fabric for the conveyor belt, use is made of yarns formed from filaments with a diameter of 5 to 50 micrometers. The diameters of these yarns, as well as the weaving or knitting method for the woven or knitted fabric, are a function of the requirements concerning the mechanical strength of the fabric and its maximum heat resistivity.

To avoid premature conductive cooling of the glass plates when taken over by the conveyor belt 10, a heating section for conveyor belt 10 is provided on a portion thereof upstream of the transfer point. This heating section comprises electric heat radiators 17, 18, which heat to an appropriate temperature the conveyor belt from one or both sides.

The bending process using the cooled bending molds 6 and 7 must take place relatively rapidly, because simultaneously with the bending process the glass plate is rapidly cooled by contact with the cooled bending mold surfaces. The bending press remains closed until the glass plate has been completely tempered. The bending press is then opened and the conveyor belt 10 is put back into movement to transfer the bent, tempered glass plate 1' to conveying rollers 20, from which it is removed with the aid of known (not shown) means.

Following its deflection by guide roller 12, the conveyor belt 10 is led at an angle α smaller than 90° to the lower reversing roller 14. Thus, beneath the guide roller 12 can be provided a broken glass container 22, which receives any broken glass on the conveyor belt if a glass plate has broken during the bending and tempering thereof. On the portion of conveyor belt 10 between the guide roller 12 and the reversing roller 14 is provided a cleaning mechanism which, e.g., comprises blowing boxes 24, 25 provided with blowing nozzles and which are provided with compressed air.

Instead of a cyclically moved, continuous belt, the conveyor belt can comprise a conveyor belt portion, which performs a reciprocating movement in the production cycle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Apparatus for bending and tempering glass plates comprising:
    a horizontal furnace for heating the glass plates to the bending temperature and having a conveyor for moving the glass plates therethrough in a direction of movement;
    a press bending station having bending tools and following the furnace in the direction of movement of the glass plates;
    a cooling station following the press bending station; and
    a flexible conveyor belt between the roller furnace and the cooling station and comprising means for horizontally conveying the glass plate into the bending station, wherein the glass plate and the conveyor belt are together bent by said bending tools and conveyed in bent form on said conveyor belt into the cooling station;
    wherein said bending tools in the press bending station comprise water-cooled, full-surface bending molds which contact the glass plates to temper the glass plates by full surface contact therewith, and wherein the conveyor belt is made from a woven or knitted fabric of heat-resistant metal fibers and has in a direction at right angles to the plate of the conveyor belt a heat resistivity of less than $5 \times 10^{-3} m^2 \times K \times W^{-1}$.

2. Apparatus according to claim 1, wherein said conveyor belt comprises a continuous belt and is guided on guide rollers and lower reversing rollers.

3. Apparatus according to claim 1, wherein said conveyor belt comprises a reciprocably movable fabric belt portion.

4. Apparatus according to one of claims 1 to 3, wherein said knitted or woven fabric forming the conveyor belt is formed of threads or yarns comprising filaments of an iron-chrome-nickel alloy.

5. Apparatus according to one of claims 1 to 3, wherein said knitted or woven fabric forming the conveyor belt is formed of threads or yarns comprising filaments of a chrome-nickel alloy.

6. Apparatus according to claim 4 wherein said threads or yarns for the woven or knitted fabric forming the conveyor belt comprise filaments with a diameter of 5 to 50 micrometers.

7. Apparatus according to one of claims 1 to 3, wherein for bending and tempering a glass plate with a thickness of 3 to 4 mm, the knitted or woven fabric forming the conveyor belt has, in a direction at right angles to the surface of the conveyor belt, a heat resistivity of $1 \times 10^{-3}$ to $2.5 \times 10^{-3} m^2 \times K \times W^{-1}$.

8. Apparatus according to one of claims 1 to 3, including heating elements for preheating the conveyor belt provided on the portion of the conveyor belt upstream of a transfer point of the hot glass plate onto the conveyor belt.

9. Apparatus according to one of claims 1 to 3, including a cleaning mechanism for the conveyor belt provided on a portion of the conveyor following a transfer point of the tempered glass plates to the cooling station.

10. Apparatus according to claim 9, wherein said cleaning mechanism for the conveyor belt comprises blowing boxes for compressed air.

11. Apparatus according to claim 5 wherein said threads or yarns for the woven or knitted fabric forming the conveyor belt comprise filaments with a diameter of 5 to 50 micrometers.

* * * * *